United States Patent
Vlahos

(10) Patent No.: US 9,514,558 B2
(45) Date of Patent: Dec. 6, 2016

(54) METHOD FOR PREVENTING SELECTED PIXELS IN A BACKGROUND IMAGE FROM SHOWING THROUGH CORRESPONDING PIXELS IN A TRANSPARENCY LAYER

(71) Applicant: iMatte, Inc., Chatsworth, CA (US)

(72) Inventor: Paul E. Vlahos, Tarzana, CA (US)

(73) Assignee: IMATTE, INC., Chatsworth, CA (US)

( * ) Notice: Subject to any disclaimer, the term of this patent is extended or adjusted under 35 U.S.C. 154(b) by 0 days.

(21) Appl. No.: 14/923,219

(22) Filed: Oct. 26, 2015

(65) Prior Publication Data

US 2016/0048991 A1 Feb. 18, 2016

Related U.S. Application Data

(63) Continuation-in-part of application No. 14/020,651, filed on Sep. 6, 2013, now Pat. No. 9,288,462.

(51) Int. Cl.
| | |
|---|---|
| *G06K 9/00* | (2006.01) |
| *G06T 11/60* | (2006.01) |
| *G06T 7/00* | (2006.01) |
| *G06K 9/46* | (2006.01) |
| *G06K 9/62* | (2006.01) |
| *H04N 9/75* | (2006.01) |

(52) U.S. Cl.
CPC ............. *G06T 11/60* (2013.01); *G06K 9/4604* (2013.01); *G06K 9/6215* (2013.01); *G06T 7/0085* (2013.01); *H04N 9/75* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 4,344,085 A | 8/1982 | Vlahos | |
| 5,896,136 A | 4/1999 | Augustine et al. | |
| 6,134,345 A | 10/2000 | Berman et al. | |
| 6,134,346 A * | 10/2000 | Berman | H04N 1/3872 345/629 |
| 6,377,269 B1 | 4/2002 | Kay et al. | |
| 6,454,415 B1 * | 9/2002 | Vlahos | G03B 21/14 348/14.1 |
| 7,826,668 B1 | 11/2010 | Zaklika et al. | |

(Continued)

OTHER PUBLICATIONS

International Search Report, dated Jan. 29, 2015, Application No. PCT/US2014/054328.

(Continued)

*Primary Examiner* — Andrae S Allison
(74) *Attorney, Agent, or Firm* — Blakely Sokoloff Taylor & Zafman LLP

(57) ABSTRACT

The present invention converts an image into a transparency, or "foreground image layer", on which the readability of text and other detail is preserved after compositing with a background, while maintaining color information of broad areas of the image. In an embodiment, a matte is determined for the background image to reduce transparencies in the foreground layer, so as to prevent irrelevant parts of the background image from showing through. This is in distinction to only using the original foreground image data (prior to its transformation to a layer) to compute a matte (or mask, or alpha channel) to form a foreground layer.

4 Claims, 4 Drawing Sheets

(56) References Cited

U.S. PATENT DOCUMENTS

| | | | |
|---|---|---|---|
| 2002/0047933 A1* | 4/2002 | Vlahos | H04N 5/208 348/627 |
| 2004/0042654 A1* | 3/2004 | Sevigny | G06T 1/00 382/167 |
| 2004/0160581 A1 | 8/2004 | Parker et al. | |
| 2005/0089216 A1 | 4/2005 | Schiller et al. | |
| 2005/0246145 A1* | 11/2005 | Zhu | G06T 15/503 703/2 |
| 2007/0019882 A1 | 1/2007 | Tanaka et al. | |
| 2008/0136898 A1* | 6/2008 | Eisenberg | H04N 7/152 348/14.09 |
| 2009/0183080 A1* | 7/2009 | Thakkar | G06F 17/30056 715/733 |
| 2009/0271821 A1* | 10/2009 | Zalewski | A63F 13/12 725/37 |
| 2010/0066762 A1* | 3/2010 | Yeh | G06T 11/00 345/629 |
| 2012/0121175 A1* | 5/2012 | Narayanan | G06T 9/007 382/166 |
| 2013/0188094 A1* | 7/2013 | Samadani | H04N 5/272 348/584 |
| 2013/0215143 A1 | 8/2013 | Pettigrew et al. | |
| 2015/0071531 A1* | 3/2015 | Vlahos | H04N 9/75 382/164 |

OTHER PUBLICATIONS

Hillman, P., et al., "Alpha channel estimation in high resolution images and image sequences", *IEEE Computer Society Conference on Computer Vision and Pattern Recognition (CVPR 2001)*, vol. 1, (2001), 1063-1068.

\* cited by examiner

FIGURE 3
Pixel Value/Color
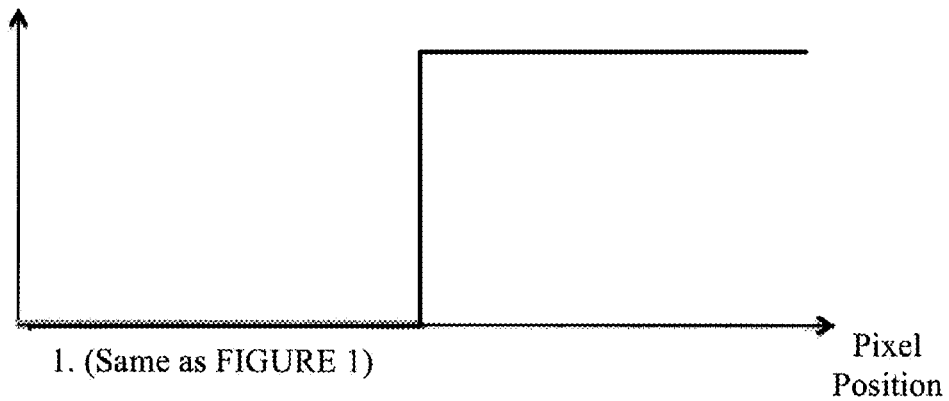
1. (Same as FIGURE 1)
Pixel Position
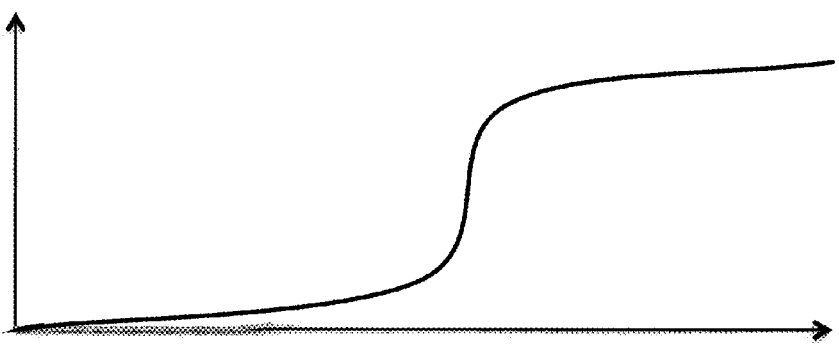
2. Gaussian low pass filter of data in 1
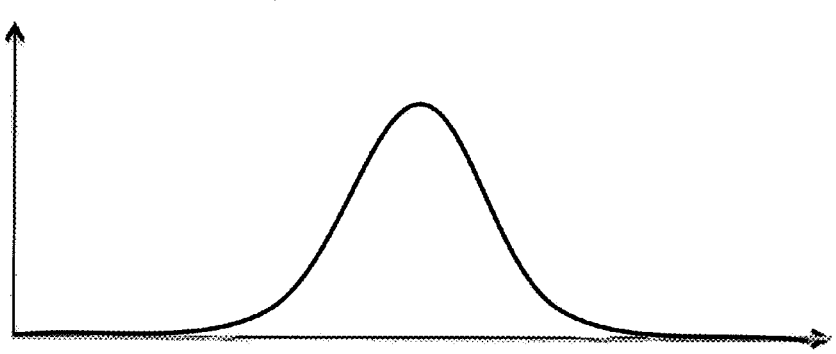
3. Derivative of data in 2; an alternative edge estimation.

METHOD FOR PREVENTING SELECTED PIXELS IN A BACKGROUND IMAGE FROM SHOWING THROUGH CORRESPONDING PIXELS IN A TRANSPARENCY LAYER

BACKGROUND OF THE INVENTION

In long distance learning, presentation material is displayed on a screen or board, and the presenter stands to the side or at times in front of the board or screen, talking about the subject and pointing to illustrations or text on the screen that would enhance the effectiveness of his presentation. In order to encode and transmit a visual of his lecture to a distant location, the presentation material is sent electronically, preferably from its original digital source if available, rather than a likely degraded "second generation" image from a camera capturing the original presentation screen.

However, it is also desired that the presenter be shown as well, so as to make the material more relatable on a human level, through his gestures, social cues, and real time reaction to the material, and to the audience, bringing the lecture to life. At the remote distant location, the presenter is shown along with the presentation material. This is typically done by displaying the presentation material on part of, or all of, the receiver's screen, with the presenter in a separate frame or "window", typically displayed on a corner of the screen. The presenter can also be composited over the presentation material to appear to be standing in front of it. The compositing of a foreground over a background has many methods of implementation. Foreground elements are isolated from an image so that what surrounded that element is replaced by the background image. Foreground elements will typically have both opaque and transparent areas that need to be identified and preserved in the finished composite.

Numerous techniques have been developed to facilitate compositing. Blue screen and green screen, front projection retro-reflective photography, sodium light, infra-red, ultra violet, chroma-key, stereo pair images, depth keys, difference keys and many other matte extraction techniques are well known and employed every day.

SUMMARY OF THE INVENTION

The invention provides an improved method to integrate the presenter with his presentation material by using the presentation image as the foreground with both opaque areas and transparent areas through which the presenter can be seen as though standing behind it, and do this in a way that does not obscure nor degrade the readability of the text or other detail shown in the presentation material. In addition, any video source, either live or recorded, can be shown as the background instead of the presenter. These can be, for example, live images of the participants, collectively, like in a classroom, or individually, or of another presenter whose image is received from a distant location. If the graphics foreground layer is composited over the distant participant, it can be sent back to the participant so he can see himself behind the graphics facilitating his interaction.

The present invention converts an image into a variable density transparency, or "foreground image with matte", on which the readability of text and other detail is preserved after compositing with a background, and which allows the background to be seen through areas in the foreground while maintaining some of the color of the foreground areas.

The Problem:

Normally, a simple blending by some proportion of dissolve of two images can cause confusion when observing the details in each. It is not always clear which detail belongs with which image. Employing a chroma key or "color range" compositing technique to place graphics over a background image avoids background detail from showing through the foreground subject, reducing some of this confusion for the solid graphics areas which are a single color or smoothly varying colors, because the background detail is not visible at all in these areas. But this is also a problem in that these areas might cover parts of the background that should preferably be visible to effect better integration of the foreground and background, e.g. of the presentation material and the presenter.

The readability of small detail such as text on the foreground image also depends on this detail contrasting against its background. For example, black text will disappear if composited over a black background. It is therefore necessary to provide a means to maintain this essential contrast in the composite in order to maintain readability of the text in the composite. The process described maintains this contrast, making the text and detail more readable and clear while allowing more of the background to show through the single color or smoothly varying colors areas of the foreground. It will also maintain a predetermined level of color of these single color or smoothly varying colors areas.

Forming the Transparency

The conversion of an image to a transparency or "foreground image with matte" is done by forming a "matte", or map of transparency levels distributed over the image pixels. Thus, in this disclosure, the term "matte" represents transparency levels. This map is typically represented by a monochromatic image. By convention, the complement of this transparency matte, which would be an opacity map, is often incorporated into the image as an additional image channel, called the "alpha" channel, in addition to the usual color channels, such as the red, green, and blue component channels for an RGB color image.

In the present invention, the matte levels are determined by the "edge" or "edginess" level of each pixel in the foreground image. These are scalar values obtained from an edge evaluator such as a derivative, laplacian, or similar filter convolved with the foreground image. Note that some of these filters would ascribe edginess to pixels in the neighborhood of the peak edge, decreasing with distance from that edge. See FIGS. 2 and 3. The edge evaluator can also consider normalizing these scalar values by values in the edge's neighborhood, to obtain detection based on ratio of values, rather than just based on value differences.

In forming the matte, greater edginess is interpreted as low transparency, and lack of edginess is interpreted as high transparency. In other words, continuous smooth (i.e, a single color or smoothly varying colors areas) regions of the foreground become (at least partially) transparent, and edges such as text or other detail become opaque to the background; the level of edginess and the level of transparency are inversely related, and the matte level, i.e. the transparency level of each pixel, can range from 0.0 (fully opaque) to 1.0 (fully transparent). To allow some of the foreground color to be visible even in smooth areas of the foreground, the matte level, or level of transparency, can be limited to some preselected maximum.

Compositing

With the matte determined, the compositing process is well known: The composite color can be computed as a weighted average of the background pixel color and the corresponding foreground pixel color. The matte or transparency level is used as the weight, or modulation, of the background color, and its complement as the weight or modulation on the corresponding foreground pixel color. In the distance learning or conferencing application described above, the background would typically consist of a live presenter image received from a distant location.

Retaining Readability

Since the edge is clear and readable in the foreground image, retaining the foreground pixel colors in the neighborhood of the edge would retain this readability in the composite. Therefore readability in the composite would be enhanced if the matte indicates at least some level of opacity in the neighborhood of a strong edge, an edge indicated by a zero matte level. This can be achieved by expanding the zero-matte areas by a few pixels, or blurring the matte. Since blurring the matte would reduce the opacity (edginess) at an edge, the matte or its complement can be scaled to retain the original matte level at the edge. Alternatively, an edge evaluator that indicates some level of "edginess" for pixels surrounding the edge would also attain the same effect. Parameters used by such an edge evaluator can determine the size of the neighborhood affected, much like the blurring window size when blurring.

Using Existing Compositing Methods:

By compositing the transparency formed using the method of this invention over a blank green-screen, the foreground image is seen as though being in front of a green-screen and can be used as such to composite with other backgrounds using existing green-screen compositing methods.

Preventing Selected Background Pixels from Showing Through Corresponding Pixels in a Transparency Layer Often, the presenter's surroundings in the presenter's image are not relevant to the presentation. When the presenter's image is to be used as a foreground layer to be composited over the presentation material, a matte, or transparency map, is generated for the presenter's image which eliminates these irrelevant surroundings, using one of many well known techniques mentioned in the Background of the Invention (blue screen and green screen, front projection retro-reflective photography, sodium light, infra-red, ultra violet, chroma-key, stereo pair images, depth keys, difference keys and many other matte extraction techniques). In this invention, since the presenter's image is used as the background image in the compositing process, a matte or distribution of transparency levels over the presenter's image pixels is not required.

Nevertheless, the same presenter's surroundings that are irrelevant when the presenter image is used as foreground, would also not be relevant when using the presenter's image as a background, as in an embodiment of the invention. Therefore, in an alternative embodiment, steps are added to remove any irrelevant surroundings which exist in the presenter's image from the composite. Specifically, a matte is computed for the presenter's image, in which the irrelevant surroundings are assigned high matte values. This computed matte is subtracted from the matte transparency map of the foreground, i.e. the transparency map computed for the presentation material.

The result is then used as the transparency map for the foreground, presentation material image.

The transparency level in the foreground layer is reduced or turned off for each foreground image pixel corresponding to (in the same position as) a background image pixel in the presenter's surrounding, and not in the presenter himself. The result would be that the presenter alone, without any of his surroundings, would show through the foreground in the final composite.

The reduction of transparency in the foreground layer can be described and effected by the following steps:
1. determine a matte for the presenter's image, forming a presenter's layer,
2. determine a matte for the presentation material image, forming a presentation layer,
3. composite the presenter's layer over the original presentation material image, then
4. composite the presentation layer over the composite formed in 3.

BRIEF DESCRIPTION OF THE DRAWINGS

FIG. 3 illustrates the edge or opacity computation of the preferred embodiment, showing gradual reduction of opacity with distance from the peak edge, but using a more sophisticated low pass filter.

DETAILED DESCRIPTION OF THE INVENTION

In the one embodiment, the matte is formed as follows.
Blur a copy of the foreground image horizontally using a selected blur window length.
Blur the result vertically using a selected blur window length.
Compute the color or brightness difference between each foreground pixel and the corresponding pixel in the blurred image.
Compute the magnitude or absolute value of this difference for each pixel.
Determine or select a threshold on this magnitude, above which an edge is to be considered definite.
Divide this magnitude by the threshold, resulting in a value range from 0.0 to 1.0.
Clip resulting values that are greater than 1.0, to 1.0.
Compute the complement of the result for each pixel. This is the matte or transparency level for each pixel.
A further optional step would be to multiply the matte computed to this point by a scale factor smaller than 1.0. This results in limiting the level of transparency over the entire foreground, permitting non-edge parts of the foreground to be visible at a level indicated by that scale factor.
With the matte determined, a composite can be formed as a weighted average of a background and the foreground image, with the matte as the weight or modulation of the background, and its complement as the weight or modulation of the foreground.

This method uses two main parameters: blur window length, and a threshold or scaling factor. The blur window length can be used for both horizontal and vertical blurring.
Otherwise, this parameter can be replaced by two parameters: one for horizontal blurring and the other for vertical.

The optional step has the effect of a maximum transparency level, indicating the maximum transparency permitted for each pixel. This allows more of the foreground colors to show even in smooth areas without edges. This additional optional adjustment can be implemented simply by multiplying the matte by the factor indicated by the adjustment, the factor ranging from 0.0 to 1.0 inclusive.

Figure 1:
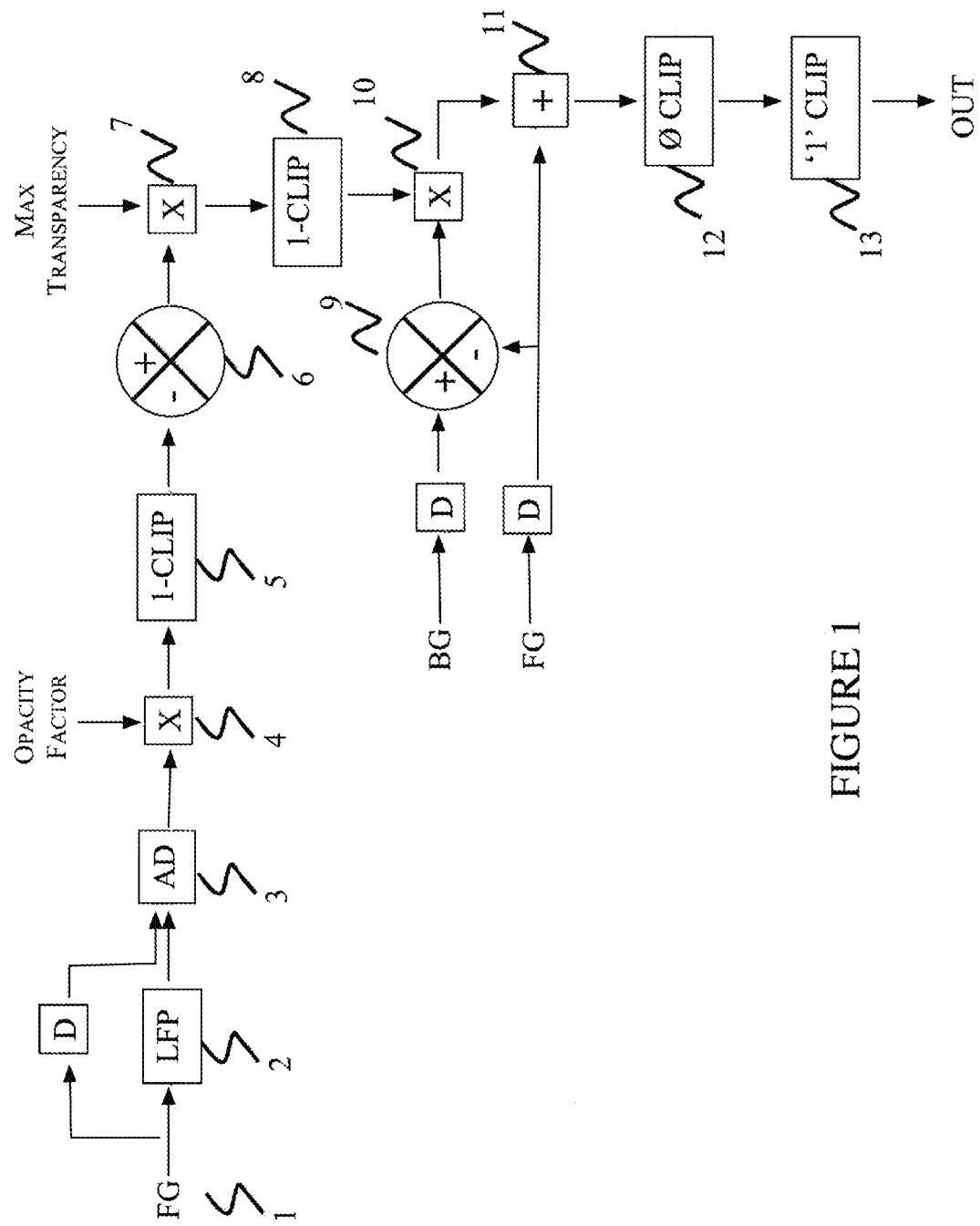
FIG. 1 is a block diagram of the preferred implementation of the invention.

The method described in this invention can be implemented as a software application in a general purpose computer, or as hardware/software combination, using FPGA devices, GPU devices or other dedicated image processing devices. FIG. 1 illustrates a preferred embodiment of a hardware/software processing apparatus, diagramming the process as follows:

The presentation or foreground image FG 1 is passed through a low pass filter LPF 2. The absolute difference or magnitude of the difference between the original foreground FG and the filtered version is computed in the AD block 3. This difference is then multiplied by an input scaling factor OP 4 to convert the range of this absolute difference to an opacity range in which 0 represents no opacity (total transparency) and 1.0 represents complete opacity (zero transparency). The opacity level is then clipped 5 so that any levels above 1.0 are replaced by 1.0. The opacity levels are then converted to transparency levels by complementing 6 the opacity (subtracting from 1.0). The result is then multiplied by an input transparency factor TR 7, with the effect of limiting the transparency to not exceed TR. The result is then clipped 8 at 1.0. This clipped result is the matte, which provides scalar values (is monochromatic) ranging from 0.0 to 1.0 and representing transparency levels for each pixel in which 0 represents complete opacity (zero transparency) and 1.0 represents complete transparency (total transparency).

The scaling factor OP 5 is user determined based on whether the user wants the edges to reach full opacity, whereas the scaling factor TR 7 is user determined based on whether the user wants the smooth areas with no edges to be fully or only partially transparent—that is, fully background, or some mix with the foreground color.

In general, it would be preferred that the text and lines as in line drawings should be fully opaque, and the user would determine the values to use by observation, but other methods could be employed based on the method of estimating edge levels, and the distribution of pixel values and value variations expected for the material being presented.

Also, this adjustment need not be made separately for each image—it could (and generally would) be fixed after an initial adjustment, generally based on observation/experimentation, e.g., when the system is setup, to accommodate the material generally presented.

The original foreground image FG 1 is then subtracted from an input background image BG 9 and multiplied 10 by the matte produced by the process described in the previous paragraphs. This product is then added 11 to the original foreground FG, and the value range clipped by clip blocks 12 and 13 to remain within a valid color range, forming the final composite.

Note that the D blocks represent delays for synchronizing the timing between the different signal paths. Also, the above mentioned range [0.0,1.0] is represented in the apparatus by a suitable integer range. For example, for data apparatus using 10 bit data, the range between 0.0 and 1.0 is represented by the range of integers from 0 to 1023.

Figure 2:
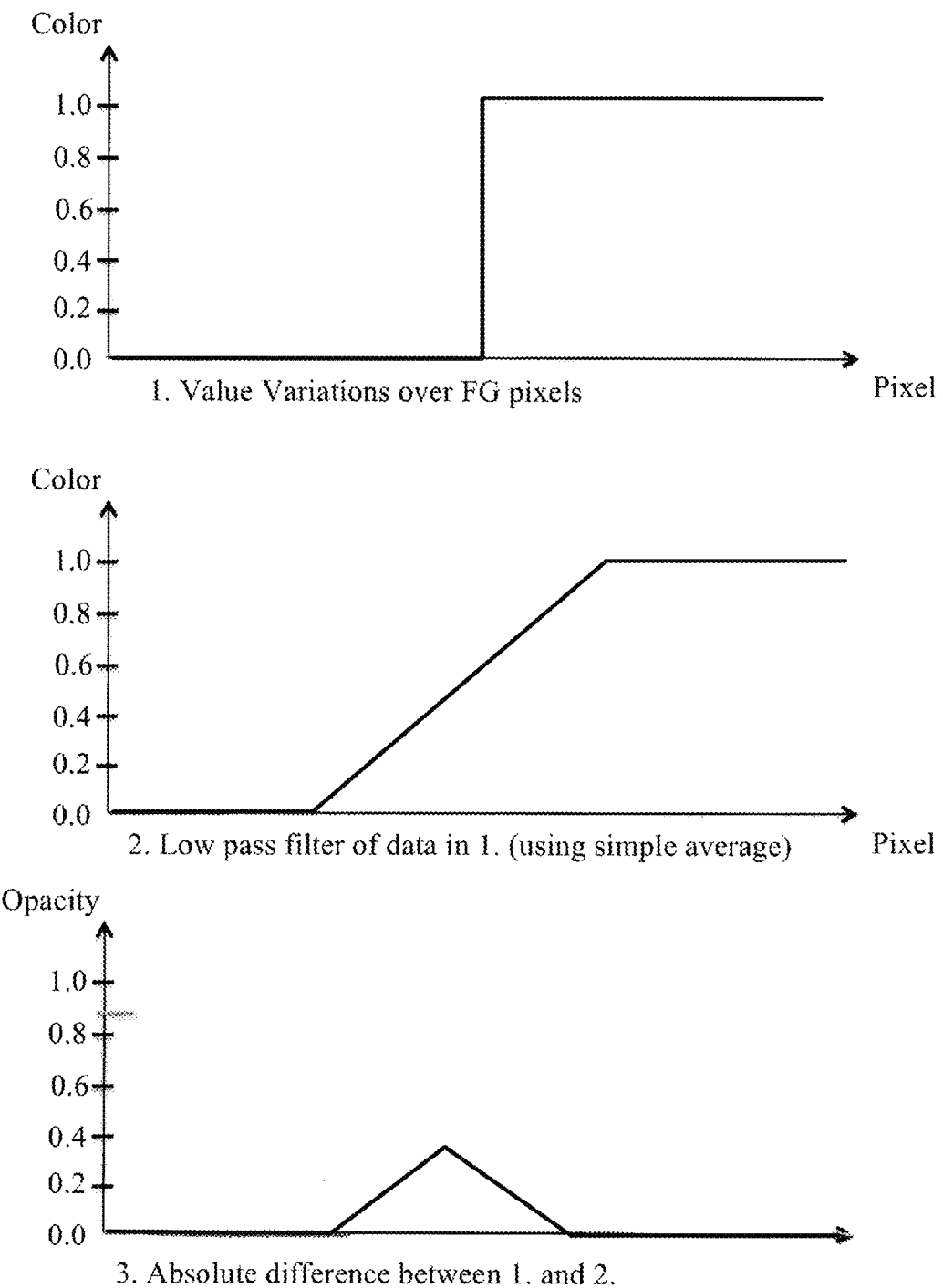
FIG. 2 illustrates the edge or opacity computation of the preferred embodiment, showing gradual reduction of opacity with distance from the peak edge.

Referring now to FIGS. 2 and 3, that if the blur (low pass filter 2) in steps one and two uses simple neighborhood averaging, the opacity would decrease to transparency linearly with distance from the peak edge as shown in FIG. 2. But if the blur uses weighted averaging like a Gaussian blur, the transition from opacity to transparency around an edge would be more graceful as shown in FIG. 3. In this connection, graphs 1, 2 and 3 in FIGS. 2 and 3 correspond to elements in FIG. 1 as follows: the signal FG 1, the output from low pass filter 2 and the output from absolute difference block 3, respectively. In FIG. 2, Graph 1 shows a step function representing value variations over FG pixels in the neighborhood of an "edge" pixel. The value range used is [0.0,1.0].

Graph 2 shows the result of a simple low pass filter (averaging the neighborhood pixels), which results in a linear ramp from 0 to 1, centered at the above mentioned edge pixel.

Graph 3 shows the absolute difference between the original (step function) and the low pass filtered version, forming a pyramid, with a peak at the original edge pixel, reaching a level of 0.5.

Figure 4:
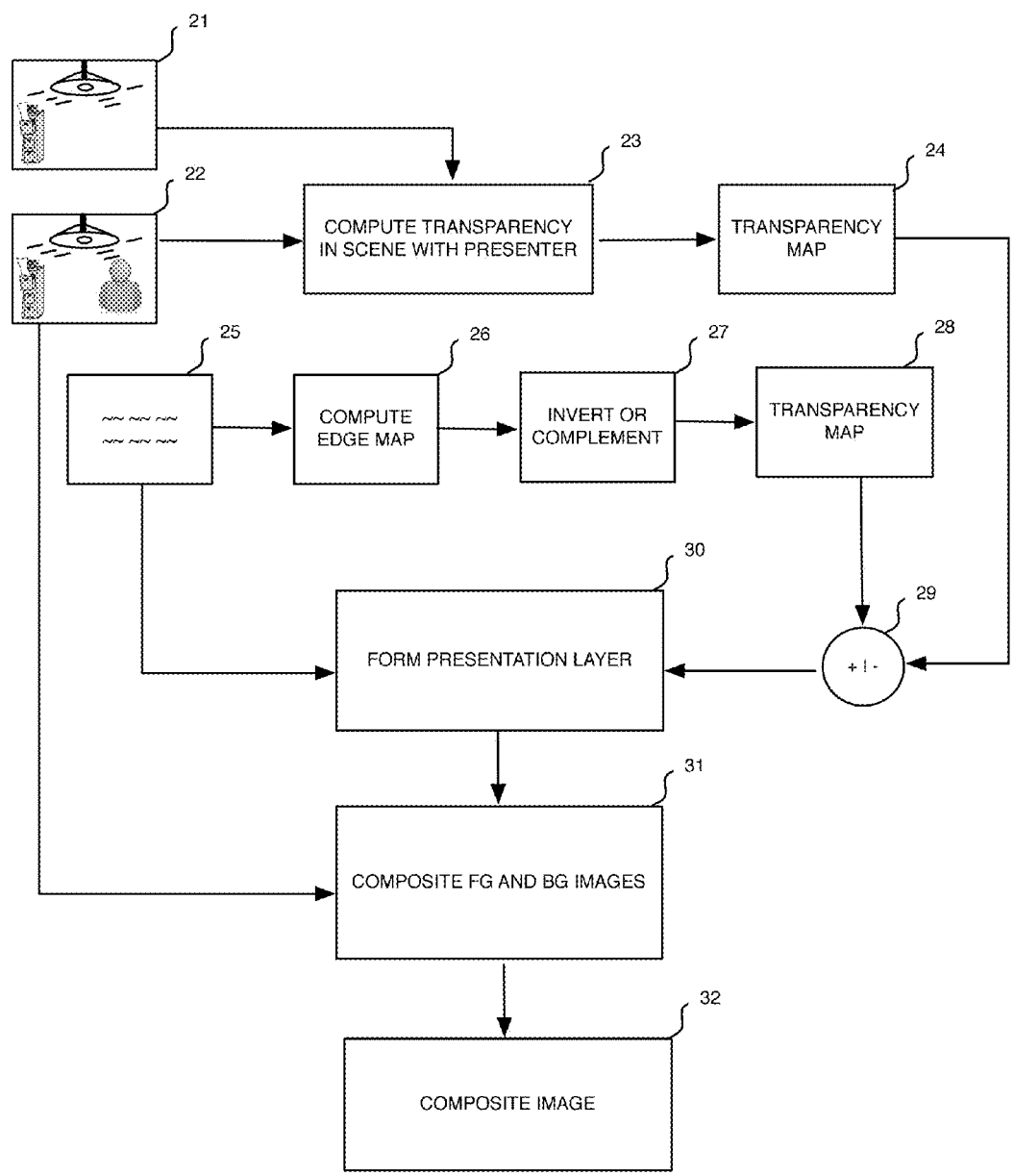
FIG. 4 is a flow diagram for preventing pixels surrounding a presenter in a background image from showing through corresponding pixels in a transparency layer including a presentation material image.

In an alternate embodiment, steps are added to prevent the surroundings of the presenter in the background image from showing through in the composite, for which a preferred implementation is shown in FIG. 4.

The invention can be used in the context of a video presentation in which the foreground layer contains the graphic presentation material (as though printed on see-through glass), and the background layer shows the presenter as though standing behind it. If the presenter is in a cluttered environment, with elements irrelevant to the presentation showing through, it could make the presentation material in the foreground layer more difficult to discern. It is therefore useful to reduce the transparency of pixels in the foreground layer corresponding to pixels in the background layer deemed irrelevant.

A scene 21 of the presenter's background without the presenter is used to generate a pixel transparency map 24 for scene 22 of the background image with the presenter present. The transparency map is determined by comparing the similarity of a pixel's color in scene 22 to a corresponding pixel's color in scene 21. This is done by computing 23 a difference between scene 21 and scene 22, or by more sophisticated well established matte computations such as those estimating the portion of background color showing through each pixel. In this manner, portions which appear in scene 21 which constitute irrelevant surroundings are assigned a high matte value relative to the other portions. That is, if a pixel's color in scene 21 is similar to that pixel's color in scene 22, in the resulting transparency matte 24, that pixel is assigned a high value.

Edges are computed 26 for each pixel in the presentation material image 25, such as by computing derivatives (neighborhood differences) for each pixel, forming an edge map. The edges are intended to be opaque, and smooth areas are to be transparent.

An inverse monotonic function 27 is applied to the edge map to form a transparency map 28, which is scaled and clipped to maintain a range of 0.0 (full opacity) to 1.0 (full transparency).

Transparency map 24 is then subtracted 29 from transparency map 28 to form a transparency map which is then attached to the presentation material image 25, forming a presentation layer 30. This final presentation layer is then composited 31 over scene 22, the scene of the presenter in his surroundings, forming the final composite.

By using this alternate embodiment, only the presenter and the presentation materials appear in the final composite.

In this manner, portions of the background image which may otherwise be a distraction, and which ordinarily would appear, are eliminated from the final composite.

I claim:

1. A method for preventing pixels surrounding a presenter in a background image from showing through corresponding pixels in a transparency layer including a presentation material image to be composited over the background image comprising:
   a) generating a pixel transparency map using a first version of the background image with the presenter in the background image and a second version of the background image with the presenter absent from the background image;
   b) generating an edge map using the presentation material image;
   c) applying an inverse monotonic function to the edge map to form a second transparency map;
   d) subtracting the first transparency map from the second transparency map to form a third transparency map;
   e) generating a presentation layer by attaching the presentation image material to the third transparency map;
   f) compositing the presentation layer over the background image with the presenter present to form a composite image, showing both the presenter and the presentation material image.

2. The method defined by claim 1 wherein said generating said pixel transparency map is performed by calculating a difference between corresponding pixels in said first version and said second version.

3. The method defined by claim 1 wherein said generating said pixel transparency map is performed by generating a matte using said first version and said second version.

4. The method defined by claim 1 wherein said inverse monotonic function is applied to the edge map to form a transparency map, which is scaled and clipped to maintain a range of full opacity to full transparency.

* * * * *